April 28, 1925.

1,535,588

R. D. EVANS

ELECTRICAL MEASURING INSTRUMENT

Original Filed July 30, 1920

WITNESSES:
J. A. Helsel
J. A. Procter

INVENTOR
Robert D Evans.
BY
Wesley G. Carr
ATTORNEY

Patented Apr. 28, 1925.

1,535,588

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed July 30, 1920, Serial No. 400,162. Renewed February 12, 1925.

*To all whom it may concern:*

Be it known that I, ROBERT D. EVANS, a citizen of the United States, and a resident of Pittsburgh, in the county of Allegheny and State of Pennsylvania, have invented a new and useful Improvement in Electrical Measuring Instruments, of which the following is a specification.

My invention relates to measuring instruments and particularly to instruments that are responsive to symmetrical components of unbalanced polyphase quantities.

One object of my invention is to provide a special meter that may be employed to indicate the symmetrical components of unbalanced quantities of an electrical system.

Another object of my invention is to provide an electro-responsive device, of the above indicated character, that shall be simple and inexpensive to construct and effective in its operation.

My copending application Serial No. 358,440, filed Feb. 13, 1920, discloses a static system to be employed with standard measuring instruments for measuring the symmetrical components of unbalanced polyphase quantities.

My present invention obviates the necessity of employing a special transformer and provides a field-magnet core member for the meter armature having a plurality of windings thereon. Static means is disposed between the windings and the circuit whereby the armature may be actuated in accordance with one phase-sequence component of the current or voltage of the circuit.

Figures 1 and 2 of the drawings are diagrammatic views of an electro-responsive device that is actuated in accordance with the positive and the negative phase-sequence components, respectively, of the voltage impressed on an electric circuit.

Figure 1:
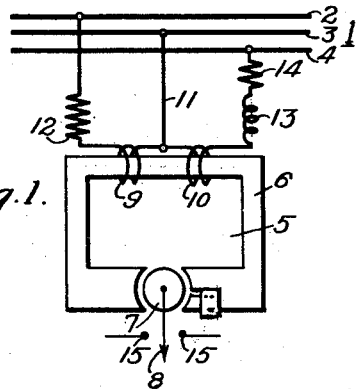

A polyphase circuit 1 comprises conductors 2, 3 and 4 upon which is impressed an unbalanced voltage or upon which the load is so unbalanced as to cause the voltage thereof to be unbalanced. A measuring instrument 5 for the circuit comprises a magnetizable core member 6, an armature 7, an indicating device 8 and windings 9 and 10. The common terminal of the windings 9 and 10 is connected, through a conductor 11, to the conductor 3 of the circuit. The other terminal of the winding 9 is connected, through a resistor 12, to the conductor 2, and the other terminal of the winding 10 is connected, through a reactor 13 and a resistor 14, to the conductor 4. The resistor 12 is of such resistance that the current traversing the winding 9 is in phase with the voltage across the conductors 2 and 3. The impedances of the reactor 13 and the resistor 14 are of such value that the current traversing the winding 10 lags 60° behind the voltage across the conductors 3 and 4.

With the arrangement shown in Fig. 1 of the drawings, magnetic flux is induced in the core member 6 of the instrument 5 to thereby cause the actuation of the armature 7 when a balanced polyphase voltage of predetermined phase sequence exists on the circuit 1. Also, the resistor 12 and the impedance of the circuit comprising the resistor 14 and the reactor 13 is such that no magnetic flux traverses the core member 6 when a balanced polyphase voltage of other phase sequence is applied to the circuit.

Figure 2:
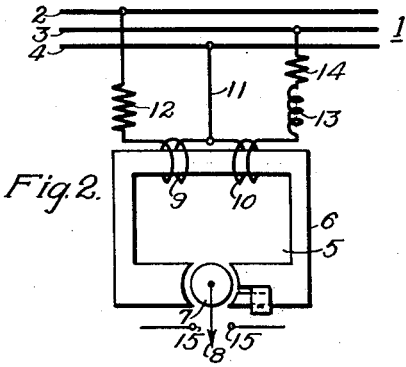

It will be seen that, with the connections shown in Fig. 1, the resultant flux effectively actuating the armature is proportional to the positive phase-sequence component of the unbalanced voltage impressed on the circuit 1. If the conductor 11 and the circuit comprising the resistor 14 and the reactor 13 are reversed in their connection to the circuit 1, as shown in Fig. 2 of the drawings, the armature 7 will be actuated in accordance with current which is proportional to the negative phase-sequence component of the unbalanced voltage impressed on the circuit. The indicating member 8 may, of course, constitute a contact member for engaging stationary contact members 15 to constitute a relay or it may co-operate with a scale (not shown) to constitute a measuring instrument.

Figure 3:
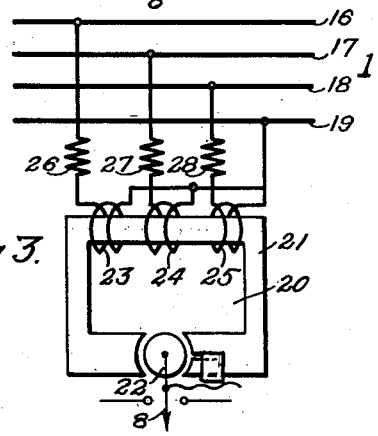
Fig. 3 is a diagrammatic view of a relay device actuated in accordance with the zero phase-sequence component of the voltage of the circuit.

In Fig. 3 of the drawings, the electric circuit comprises four conductors 16, 17, 18 and 19, the conductor 19 of which is a neutral conductor. An electro-responsive device 20, such as a relay, comprises a core member 21, an armature 22 and three windings 23, 24 and 25, one terminal of each of the windings being connected to the neutral conductor 19 and the other terminal of the windings being connected, through equal resistors 26, 27 and 28, to the respective conductors 16, 17 and 19. With this arrangement, the armature 22 will be actuated when the sum of the voltage drops across the various phases is other than zero. That is, the movable contact member of the relay 20 indicates the zero phase-sequence component of the voltage on the circuit. In other words, when a fault obtains on the device (not shown) that is connected to the circuit and which is to be protected, flux will be induced in the core 21 to effect the operation of the armature 22.

Figure 4:
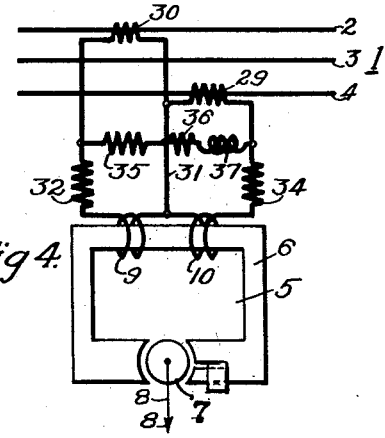
Figs. 4 and 5 are diagrammatic views of an electro-responsive device actuated in accordance with the positive and the negative phase-sequence components, respectively, of the current traversing the circuit.
Figure 5:
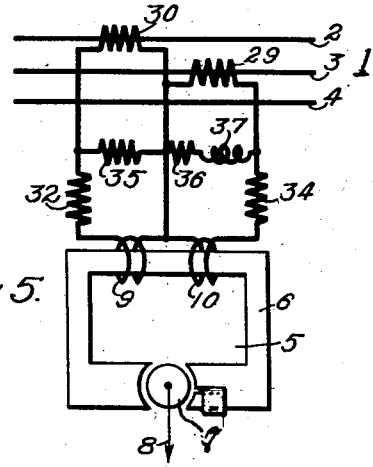

In Figs. 4 and 5 of the drawings, a three-phase circuit 1 is operatively connected, through series transformers 29 and 30, to an electro-responsive device 5 comprising a core member 6 and two windings 9 and 10. The transformers 29 and 30 are connected, through a conductor 31, to the common terminals of the windings 9 and 10, and the transformer 30 is connected, through a resistor 32, to the other terminal of the windings 9. Similarly, the series transformer 29 is connected, through a resistor 34, to the other terminal of the windings 10. A resistor 35 is connected across the terminals of the transformer 30, and a resistor and a reactor 37 are connected in series across the terminals of the transformer 29. With the arrangement shown in Figs. 4 and 5 of the drawings, the resistor 35 has voltage impressed thereacross which is proportional to the current traversing the conductor 2 of the circuit 1, and the resistor 36 and reactor 37 have voltage impressed thereacross which is proportional to the current traversing the conductor 4 in Fig. 4 and the conductor 3 in Fig. 5 of the drawings.

Thus, as set forth with respect to Figs. 1 and 2 of the drawings, the current traversing the windings 10 of Fig. 4 will be 60° out of phase with respect to the current traversing the transformer 29. Similarly, the current traversing the winding 9 will be in phase with the current traversing the transformer 30. Thus, the armature 7 will be actuated when the transformers are connected, as shown in Fig. 4, in accordance with the positive phase-sequence component of the current traversing the circuit 1 and will not be affected by the negative sequence current. When the transformers are connected as shown in Fig. 5, the armature 7 will be actuated in accordance with the negative phase-sequence component of the current traversing the circuit 1 and will not be affected by the positive sequence current.

Figure 6:
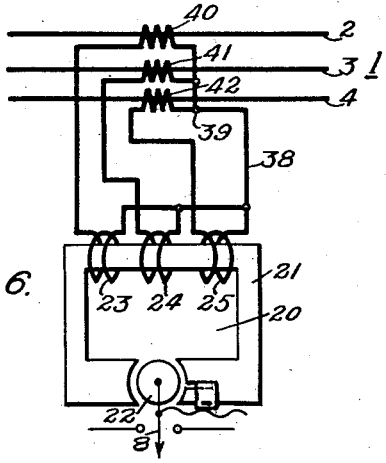
Fig. 6 is a diagrammatic view of a relay actuated in accordance with the zero phase-sequence component of the current traversing the circuit.

In Fig. 6 of the drawings, an electro-responsive device 20, such as a relay, comprises a core member 21, an armature 22 and three windings 23, 24 and 25 substantially as shown in Fig. 3 of the drawings. One terminal of each of the windings 23, 24 and 25 is connected, through a conductor 38, to the common terminal 39 of three star-connected series transformers 40, 41 and 42 which are associated with the respective conductors 2, 3 and 4 of the circuit 1. The remaining terminals of the windings 23, 24 and 25 are connected to the other terminals of the transformers 40, 41 and 42.

With the arrangement shown in Fig. 6 of the drawings, flux will be induced in the core member 21 when a fault obtains on the circuit 1 to cause the contact member of the armature 22 to be actuated in accordance with the zero phase-sequence component of the current traversing the circuit 1. That is, the device 20 may be used as a relay to protect against faults on the circuit 1 or as an indicating device to indicate zero phase-sequence components of the current traversing the circuit 1.

My invention comprises means whereby a static system of resistors and reactors may be combined with a special electro-responsive device to constitute a unitary measuring instrument or relay to indicate the various phase-sequence components of the electrical quantities of a circuit. My invention, however, is not limited to the specific structures illustrated, as various changes may be made therein without departing from the spirit and scope of the invention, as set forth in the appended claims.

I claim as my invention:

1. A measuring device for a polyphase circuit comprising an armature, a field-magnet core member therefor, a plurality of windings for the core member and means connected between the windings and the circuit whereby the armature is actuated in accordance with the positive or negative component of a set of symmetrical quantities into which the unbalanced quantities of the circuit may be resolved.

2. An electro-responsive device for a polyphase circuit comprising an armature member, a stationary magnetizable core member therefor, a plurality of windings for the core member and stationary means connected between the circuit and the windings whereby the armature member is actuated in accordance with the positive or negative phase-sequence component of an electrical quantity of the circuit.

3. An electro-responsive device for a polyphase circuit comprising an armature member, a plurality of windings for actuating the armature member, and resistors and reactive impedance devices connected between the circuit and the windings whereby the armature member is actuated in accordance with one phase-sequence component of an electrical quantity of the circuit.

4. An electro-responsive device for a polyphase circuit comprising an armature member, a plurality of windings for actuating the armature member, and resistors and reactive impedance devices connected between the circuit and the windings whereby the armature member is actuated in accordance with the positive, or the negative phase-sequence component of an electrical quantity of the circuit.

5. An electro-responsive device for a polyphase electric circuit comprising an armature member, pole pieces therefor, a winding for the pole pieces, and stationary means connected between the winding and all phases of the circuit for causing the armature member to be actuated in accordance with the positive or the negative phase-sequence component of the voltage of the circuit.

6. An electro-responsive device for a polyphase electric circuit comprising an armature member, pole pieces therefor, a winding for the pole pieces, and means connected between the winding and all phases of the circuit for causing the armature member to be actuated in accordance with the positive or the negative phase-sequence component of the voltage of the circuit.

7. An electro-responsive device for a polyphase electric circuit comprising an armature member, a field-magnet core member, two windings thereon and stationary means connected between the windings and the circuit whereby no flux is induced in the core member when a balanced polyphase voltage of one phase-sequence is applied to the circuit and flux is induced therein when a balanced polyphase voltage of another phase sequence is applied to the circuit.

8. An electro-responsive device for a polyphase electric circuit comprising an armature member, two series-connected windings for actuating the armature member, a resistor connected between one terminal of one winding and the circuit, a reactive impedance device connected between one terminal of the other winding and the circuit, and a conductor connected from a point between the windings and the circuit.

In testimony whereof, I have hereunto subscribed my name this 19th day of July, 1920.

ROBERT D. EVANS.